United States Patent
Chouanard et al.

(10) Patent No.: US 7,734,605 B2
(45) Date of Patent: Jun. 8, 2010

(54) DYNAMIC QUOTA POLICY FOR QUEUING MECHANISM

(75) Inventors: Jean Chouanard, Redwood City, CA (US); Swee B. Lim, Cupertino, CA (US); Michael J. Wookey, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 667 days.

(21) Appl. No.: 11/209,305

(22) Filed: Aug. 22, 2005

(65) Prior Publication Data

US 2007/0043772 A1 Feb. 22, 2007

(51) Int. Cl.
*G06F 17/30* (2006.01)

(52) U.S. Cl. .................. 707/705; 707/736; 707/752

(58) Field of Classification Search .................. None
See application file for complete search history.

(56) References Cited

U.S. PATENT DOCUMENTS

| | | | |
|---|---|---|---|
| 6,504,621 B1* | 1/2003 | Salgado | 358/1.16 |
| 6,981,003 B2* | 12/2005 | Pauliks et al. | 707/200 |
| 7,072,303 B2* | 7/2006 | MeLampy et al. | 370/238 |
| 2005/0226059 A1* | 10/2005 | Kavuri et al. | 365/189.05 |
| 2005/0249220 A1* | 11/2005 | Olsen et al. | 370/395.4 |
| 2006/0146825 A1* | 7/2006 | Hofstaedter et al. | 370/392 |

* cited by examiner

*Primary Examiner*—Don Wong
*Assistant Examiner*—Belinda Xue
(74) *Attorney, Agent, or Firm*—Brooks Kushman P.C.

(57) ABSTRACT

Methods and systems for effecting cleanup and other policies for queues and similar data stores, which policies account for preferences of consumers of the data so stored. Queuing policies for local storage of one or more documents for transmission from the local storage to one or more end points for said documents are retrieved from a remote registry. Upon such retrieval, the documents are enqueued according to the queuing policies, unless, prior to such enqueuing the queues into which the documents are to be placed require creation or clean-up, for example according to one or more queue quota policies. In some cases, the documents are queued according to associated qualities of service to be accorded to delivery of said documents. Such qualities of service may be specified in the queuing policy.

13 Claims, 2 Drawing Sheets

DYNAMIC QUOTA POLICY FOR QUEUING MECHANISM

FIELD OF THE INVENTION

The present invention relates to methods and systems for effecting cleanup and other policies for queues and similar data stores, which policies account for preferences of consumers of the data so stored.

BACKGROUND

Many communication systems employ queuing mechanisms as means for sending and/or receiving information. Such mechanisms allow messages, information packets or other data items to be collected or otherwise assembled in a holding area prior to transmission at designated transmission times and/or to be stored prior to further processing by receivers. The use of these queuing mechanisms thus allows for orderly processing of both incoming and outgoing messages.

All queuing mechanisms implement some form of quota management. By this we mean that queuing mechanisms (or the controllers governing same) employ some means to limit the size of the storage area (e.g., memory) used by or accessible to the queues, or to handle exceptions such as a full disks, memory overruns, etc. Such quota managers, as implemented by conventional queuing systems, are typically not aware of the semantics of the queued messages. However, such semantics are often of importance to the end consumers of the queued messages. For example, common information types among different messages are often used in different manners by different consumers of such messages and, therefore, the messages have a different semantics associated with them.

As an example, in most quota management systems queue cleanup policies are only loosely coupled to semantics of the messages stored therein as such queues are used as generic containers. While the cleanup policies may include some refinements on how data is selected for removal, those policies are generally limited to operating across generic semantics shared by all data types, and without regard as to how the data consumer will use or value the data content, origin and date.

Consequently, what is needed is a queuing mechanism that accounts for preferences or other characteristics of the consumers of the data to be stored in the queues.

SUMMARY OF THE INVENTION

In accordance with one embodiment of the present invention, a queuing policy for local storage of one or more documents for transmission from the local storage to one or more end points for said documents is retrieved from a remote registry. Both the queuing policy and the remote registry are associated with the offering. Upon such retrieval, the documents are enqueued according to the queuing policy, unless, prior to such enqueuing the queues into which the documents are to be placed require clean-up according to one or more queue quota policies. Such queue quota policies may be specified in the queuing policy. In some cases, the documents are queued according to associated qualities of service to be accorded to delivery of said documents. Such qualities of service may be specified in the queuing policy. That queuing policy may described in an extensible markup language (XML) document. Where necessary, one or more queues for the documents may be created after retrieving the queuing policy and prior to enqueuing of the documents. In some cases, the registry may be co-hosted with at least one of the document end points.

In a further embodiment, documents are enqueued according to policies associated with an offering prior to delivery to one or more document endpoints. Such enqueuing is preferably to one or more queues of a communication system segregated by quality of service and subject to queue quotas defined by said offerings. The queue quotas may, for example, define queue cleanups configured to preserve those of said documents useful for said offering to determine trends from data reported by said documents, to preserve those of said documents including data indicative of most recent configuration information for assets serviced by said offering, and/or to preserve documents including data which triggers notifications by said offering. The policies may be, prior to such enqueuing, retrieved from a registry associated with the offering.

Another embodiment of the present invention provides a system having a first module configured to format a document for transmission from a local document storage location to a remote document endpoint according to first offering-specific criteria to produce a so-formatted document, and a second module communicatively coupled to receive the so-formatted document from the first module, the second module being configured to enqueue the so-formatted document prior to transmission according to second offering-specific criteria. The second offering-specific criteria may include a queue quota policy for a queue into which the so-formatted document is to be enqueued and/or may be configured to enqueue the so-formatted document into the queue according to a quality of service to be afforded delivery of said so-formatted document to said remote document endpoint.

Still a further embodiment of the present invention provides a computer-readable medium having stored thereon a set of computer-readable instructions, which instructions when executed by a computer processor cause the processor to perform a sequence of operations so as to retrieve, from a remote registry associated with an offering, a queuing policy for local storage of one or more documents for transmission from the local storage to one or more end points for said documents through a communication system accessible by the offering, and enqueue said documents according to said queuing policy. Further additional instructions to, prior to said enqueuing, effect queue quotas (by, for example, certain queue clean-up policies) as specified by said queuing policy may also be included.

BRIEF DESCRIPTION OF THE DRAWINGS

The present invention is illustrated by way of example, and not limitation, in the figures of the accompanying drawings in which.

DETAILED DESCRIPTION

Figure 1:
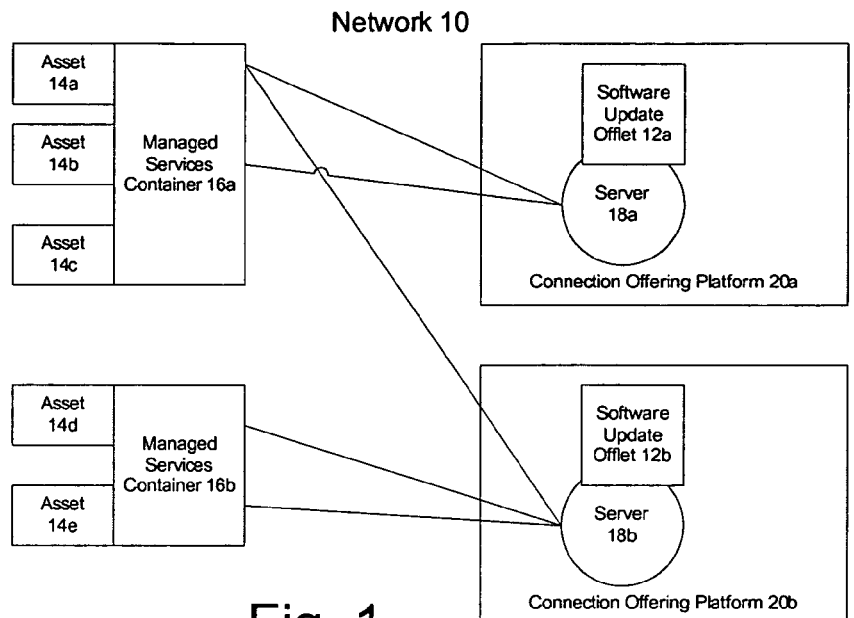
FIG. 1 illustrates an example of a network configured in accordance with an embodiment of the present invention including managed service containers (MSCs) and associated connection offering platforms (COPs)

Described herein are methods and systems for effecting cleanup and other policies for queues and similar data stores, which policies account for preferences of consumers of the data so stored. Although the present invention will be discussed with reference to certain illustrated embodiments thereof, readers should remember that such illustrations and references are not intended to limit the more general scope and nature of the present invention, which is best understood by reference to the claims following this description.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed (e.g., by a computer processor or other machine) in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can also be implemented with apparatus to perform the operations described herein. These apparatus may be specially constructed for the required purposes, or may comprise one or more general-purpose computers, selectively activated or reconfigured by a computer program stored in or accessible by the computer(s). Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

In one embodiment, the present methods and systems are adapted for use within an environment in which "offerings" (i.e., application programs and the like) installed at computer systems/networks at one ore more user locations communicate with processes running on remote computer systems (e.g., servers or other systems as may be installed at data centers, service centers, etc.). Such an environment may be used, for example, to provide remote support for the offerings, allowing the users of the offerings to be freed from tasks such as installing periodic software updates and patches. Of course, many other examples of the use of such an environment exist and the examples presented herein are in no way meant to limit the more general applicability of the present invention. As will become apparent from the discussion below, the architecture of this environment includes both an infrastructure made up of common services (these may include, for example, communications, data management, data visualization, etc.) and a series of components called "offlets" that provide customized instances of these common services specific to/for an offering.

FIG. 1 illustrates these concepts and their relationship to one another in the context of a network 10. An offering describes the technology (e.g., software, hardware, etc.) required to provide a suite of services to an end user (i.e., assets employed by the user). The technology is broken into offlets 12$a$, 12$b$ and a series of common services that are supported by a hardware and software infrastructure. Offlets are configured to take advantage of these common services and are themselves made up of a series of services, asset information and interaction logic that is otherwise not provided by the common services.

As the term is used herein, an asset 14$a$-14$e$ can be any element (e.g., computer hardware, software, storage, a service processor, a mobile phone, etc.) that can interact with an offering; or, more generally, something the associated offering helps manage or provides some service to. An asset then can be hardware that is adapted to provide a service, an operating system running on the hardware, and/or an application program running on the operating system. The offerings collect information from and/or provide information to the assets via network 10. To support these activities, the network 10 includes a common communication architecture managed by a common software infrastructure; in particular, by instances of a managed services container (MSC) 16$a$, 16$b$. The MSC represents the software that can interact, either directly or via a proxy, with the one or more assets of interest.

Relationships between assets and offlets are flexible inasmuch as servers 18a, 18b hosting one or more offlets may be located anywhere and assets can be served by more than one offering through an offlet. Thus, the present communications architecture adopts a different model from that found in deployments where a large number of servers report back to a large data center. Such data centers are very expensive to create and to maintain, especially for offerings where a large number of assets are participating. By contrast, in the present scheme offerings are delivered from any number of different servers that can be distributed anywhere that is network accessible by the assets. No topological restrictions exist. The part of the software infrastructure that supports these sorts of deployments is called the connection offerings platform (COP) 20a, 20b. The COP manages the interfaces, provides the infrastructure and contains the common services that offlets need to operate within, and hosts the offlets that provide the business technology capabilities to fulfill the overall needs of the offerings.

Figure 2:
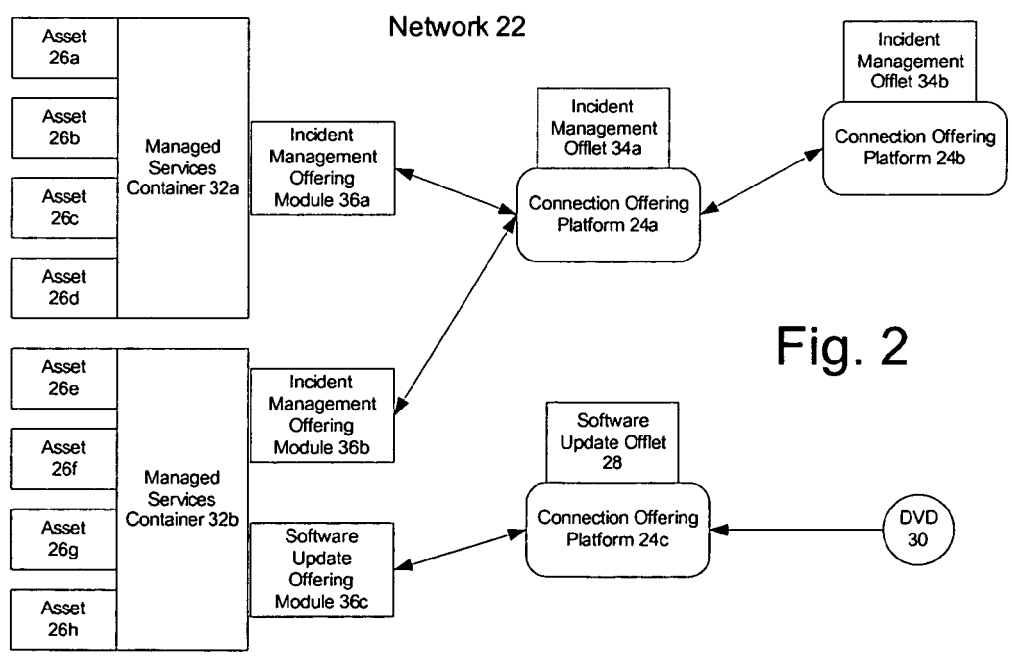
FIG. 2 illustrates in further detail relationships between MSCs and COPs in accordance with yet another embodiment of the present invention.

FIG. 2 shows an example of a network 22 of COPs 24a, 24b, 24c providing offerings used by a number of assets 26a-26h. In this example, three COPs are utilized to provide two offerings. The first offering, a software update with an associated software update offlet 28, is provided from a platform 24c residing within a local area network (e.g., the user's network). This platform 24c is disconnected from external networks and relies on the receipt of hard copy updates 30 (e.g., in the form of CD-ROMs, DVDs or other media) that contain new software from the service provider. These media contain content that can be loaded by the software update offlet 28 (and via one or more MSCs 32a, 32b) to ensure that the associated assets 26e-26h are maintained and up to date. In this mode the COP 24c is operating in a disconnected fashion.

The second offering, incident management, is supported by two offlets 34a, 34b. One offlet 34a runs on a COP 24a located at a level 1 service provider site, the other 24b in the main service provider's premises. Offlets can contain other offlets and in this case the overall incident management offlet contains two offlets. One, offlet 34a, provides automated incident management and analysis along with a basic knowledge base sufficient to facilitate first level support. If the incident cannot be resolved at this level, the incident is escalated by the offlet 34a to a second incident management offlet 34b, which contains a more detailed knowledge base so as to facilitate managing the incident to closure.

As shown, communication can be MSC-to-COP (e.g., to provide for the transmission of telemetry or the issuing of commands to an offlet for processing) and/or COP-to-COP (e.g., to support distributed offlet processing). Either or both of these forms of communication can be restricted to an internal network (or network of networks) or may operate across a wide area network or Internet.

Finally, FIG. 2 introduces the concept of offering modules 36a, 36b, 36c, which exist within the MSCs to support interaction between the offlets and the assets. The offering modules are designed to facilitate customizations of the common services (such as communication services, etc.) provided by the MSCs, for example so as to collect or filter information only relevant to particular assets and offerings.

Figure 3:
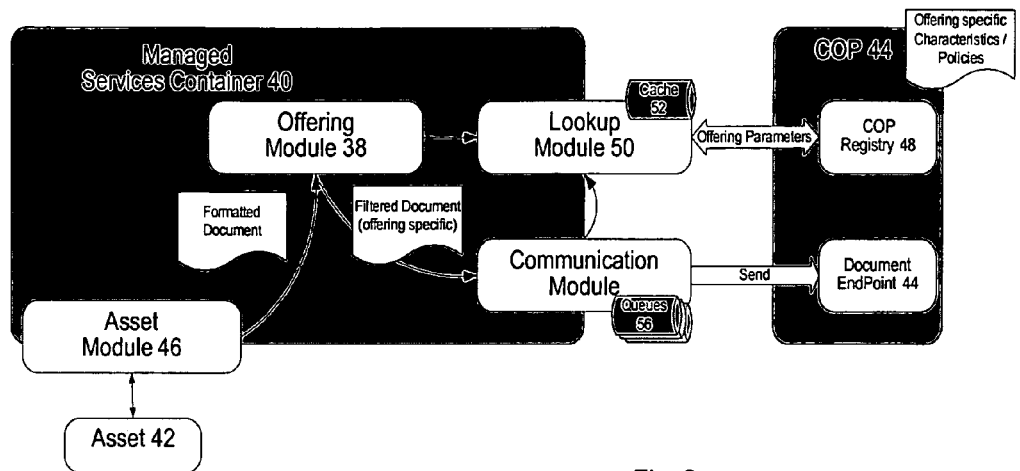
FIG. 3 illustrates modules involved in communications between the MSC and the COP in accordance with an embodiment of the present invention.

FIG. 3 illustrates in more detail the role of an offering module 38 within an MSC 40 and its various intercommunications with an asset 42 and a COP 44. As discussed earlier the MSC 40 provides certain common services to all assets, including the abstraction of the communications to/from the COP. Within the present network environment communications between the asset 42 and the COP 44 (i.e., the offlet hosted at the COP 44 and associated with the offering providing services to the asset) are based on a document model where each message is treated as a separate document (e.g., an extensible markup language (XML) form or other document). This document model allows for various customizations, such as communication quality of service, on an offering-by-offering basis. Individual offerings can thereby dictate the handling of their messages (e.g., for disaster recovery and other purposes) while still making use of a common communications infrastructure available to all offerings.

Recall that an asset 42 can be any combination of hardware and/or software. To provide a means of integrating and managing such assets (which by their nature can be quite diverse), asset modules 46 are provided. Given the diversity of assets available, different asset modules for each type of asset monitored or acted upon by offerings provisioned to the MSC 40 may be used to expose the assets' native programming/communication environment. Stated differently, asset modules 46 provide a mapping between that which an asset's native agentry exposes and a common information model (e.g., the document model described above) used by the MSC 40. Communication between asset modules and their associated assets can take the form of simple network management protocol (SNMP) or intelligent platform management interface (IPMI) communication, system calls, "command scrapings", etc.

Asset module 46 thus interacts with the asset 42 and allows for protocol nonnalization (i.e., the asset module communicates with the agent using the agent's native protocol or native application programming interface (API) while providing a common interface inbound into the MSC) and data model normalization (i.e., the asset module translates the asset's native data model into the common information model used within the network). Asset modules are configured based on the needs of the associated offlet(s) and abstract the protocol/model/control variances in the assets.

The documents (i.e., messages) provided by the asset module 46 are received in the MSC 40 by the offering module 38. Such offering modules plug directly into the MSC 40 through one or more exposed APIs and access the asset module(s) 46 as needed through the normalized interface that is exposed to the MSC. Examples of these modules might include modules for asset management, software updating, hardware fault reporting, etc. Each offering module 38 is thus provisioned to support an associated offering hosted on one or more connected COPs 44.

Upon receipt of a document from the asset module 46, the offering module 38 filters and/or formats the document according to the associated offering-specific rules for such items. To do so, the offering module retrieves the offering rule parameters from a COP registry 48 maintained by the COP 44 hosting the associated offlet. The COP registry is discussed further below. This retrieval may be done via a lookup module 50, which may include a local cache 52 used to store locally copies of the offering parameters (i.e., configuration information) so as to minimize the need for communications between the offering module 38 and the COP 44. The offering parameters returned to the offering module 38 may include the destination for the document (e.g., a URI of a data store for the message at the COP 44 or elsewhere), the quality of service for the delivery of the document, filtering patterns to employ (e.g., XML path language expressions to specify the locations of structures and data within an XML document), and/or a method to use in sending the document (e.g., simple object access protocol (SOAP)/Java messaging service (JMS), representational state transfer (REST), hypertext transfer protocol (HTTP), etc.).

The offering-specific rules obtained from the COP registry 48 or lookup module cache 52 essentially customize the general communications infrastructure provided by the MSC 40. Based on these rules, the offering module 38 prepares and formats the document received from the asset module 46 and passes the (now offering-specific) formatted document to the communication module 54 for delivery to the document endpoint 58 at COP 44 (or elsewhere as specified by the URI returned from the registry 48). Communication module 56 may include one or more queues for storing such documents prior to transmission to the document endpoint 58, for example as a means for providing various document delivery quality of service (QoS). Documents are transmitted using the method and QoS defined by the offering.

From the above it should be apparent that COP 44 acts in various capacities, for example as a data aggregation point, a services aggregation point and a knowledge delivery vehicle. A COP's role in the overall network is defined by the offerings that it supports, its relationship with other COPs and its relationships with its MSCs. It is important to note it is the offering that determines the platform's behavior, the data transmission and the knowledge application. The COP simply provides the common features that allow this to happen.

The COP registry 48 is a container that persistently stores configuration and topology information for an instance of the COP to operate in the network. To reduce complexity in management and administration of the network, everything a COP needs to operate with its associated assets/MSCs, provisioned offerings, and even other COPs may be stored in the registry, for example:

a) Topology information for assets, MSCs and other COPs.
   b) Appropriate information to create communication endpoints.
   c) A local offering registry (i.e., a registry of all of the offerings that are contained within the COP that the registry is a part of and which may include the name and a description of the offerings, URIs for MSCs and COPs associated with the offerings and/or pointing to any software needed by those MSCs/COPs, configuration options for the offerings, and software bundles for the offerings (if appropriate)). The local offering registry is the data store of record for each COP that represents the information pertinent to accessing, activating and provisioning offerings on the COP and the associated MSCs.
   d) Connection mode and connection quality of service (QoS) properties for communicating with MSCs and COPs.
   e) Privacy policies associated with offerings.
   f) User authentication/authorization information, personalization information and/or customization information.

Information exchange between the COP 44 and MSC 40 is bidirectional, but the communications will always be initiated by the MSC 40. As indicated above, such communications are initiated by the MSC's lookup module 50, seeking, for example, an address (e.g., a URI) of a document end point 58 from the COP registry 48 for the specific type of document to be sent. Once the address of the end point is known, the MSC 40 can send the document to that address. An inbound message broker (not shown) at the COP 44 may receive and dispatch the document to an appropriate message handler, which may then process and parse the document and trigger the appropriate business process.

The reverse data flow from the COP 44 to the MSC 40 is similar. When an offering needs to send information back to or execute a command on a specific MSC, it will perform a lookup to retrieve the specific address for the MSC endpoint. The message is then dispatched to an appropriate outbound message broker for eventual retrieval by the MSC 40 (e.g., through an intermittent polling mechanism). The actual data flow may depend on the messaging system used to implement the outbound message broker and/or the type of connection that exists between the MSC 40 and the COP 44. All of these communications may be managed asynchronously, such that once a message is committed to an appropriate message broker the sender can continue processing other documents.

Figure 4:
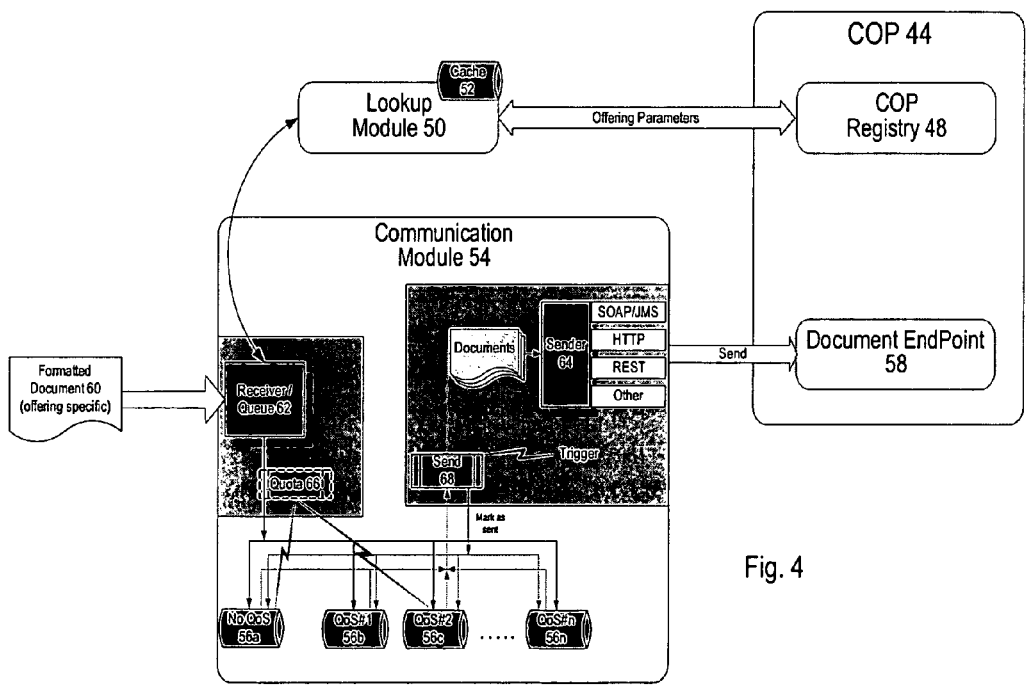
FIG. 4 illustrates in further detail aspects of the communication modules shown in FIG. 3.

FIG. 4 illustrates communication module 54 in further detail. The offering-specific formatted document 60 is received in communication module 54 at a receive queue 62. It is dispatched from the receive queue to an outbound message queue 56a-56n according to the QoS parameters specified by the offering. In one embodiment, one of these outbound message queues may be used for documents for which no QoS is specified. In cases where a particular queue's quota of messages has been reached, or will be reached by the addition of a new document, queue cleanup may be performed prior to enqueuing the new document. This queue cleanup procedure may be offering-specific as directed by queue policies specified by offering parameters obtained from the COP registry 48. In one embodiment of the present invention the queue quota policies are described in XML documents defining two characteristics of the queues: the first associated with the size of the queues (which parameter will trigger the cleanup), the second describing the method(s) used to perform the cleanup when it is needed (e.g., remove oldest messages first, remove largest messages first, remove low priority messages first, etc.). The specified method may be called when either the queue-specific policy defining its size has triggered it, or when a more generic event does so.

The document queues 56 are specific per offering and per QoS/transport/endpoint. That is, different queues may exist for documents having different QoS transmission parameters, different transport mechanisms and/or different endpoints. Documents are transmitted out of the queues 56 according to triggers, which may be event driven or time driven (or both), under offering-specific policy control. Outbound documents are passed to a sender module 64 appropriate for the type of transport to be used and the sender module transmits the documents to the associated endpoint 58.

To summarize then, before inserting a new document 60 in any queue, the communication module 62 will call a queue quota manager 66. The quota manager 66 will, for each queue or for the document's targeted queue and based on the policies associated with the subject queue(s), determine whether or not the subject queue(s) has/have reached its/their limits. If so, the quota manager will call an associated cleanup procedure. The order of how the queues and quotas are checked is defined either on a per-queue based limit, or by a global queue limit setting associated with an ordering mechanism to call, in order, the cleanup processes. This global mechanism will decide in which order the queues will be cleaned up when the global limit is reached. One the clean-up procedures have been completed (if they were in fact performed), then for a document 63 for which the COP registry lookup has returned a quality of service, that document is queued in the associated queue for the specific offering and QoS. If such a queue does not yet exist within the communication module 54, the communication module 54 will create it. For a document for which the COP registry lookup has returned no QoS, the document will be stored with like documents (i.e., those with no associated QoS) in a single queue. Documents are transmitted out of their respective queues according to triggers (event-driven or otherwise).

Thus, the present communication mechanism provides the ability to delegate definitions for queue quotas and cleanup policies to the final destination (i.e., the offering) of the data being queued. Before inserting a new document in a queue, the communication module 54 will call a sub component 66 handling queue quota management. The quota manager 66 will, for each queue affected by the receipt of the document and based on the policies associated with such queue(s), determine whether or not the subject queue has reached its quota as defined by the offering parameters. If so, the queue manager 66 will call the cleanup procedure(s) appropriate for the subject queue. The order and manner of the quota check/queue cleanups may be defined on a per-queue based limit, or by one or more global queue settings associated with an ordering mechanism to call in order the cleanup procedures. This global mechanism will decide in which order the queues will be cleaned up when the global limits are reached. In one example, the cleanup process may see the non-QoS queue 56a cleaned first, followed by cleanup of the remaining queues in a priority order.

Importantly, the queue cleanups are driven by a dynamic update of the offering associated parameters and on a per QoS/queue basis. Among the advantages of such an approach are: the ability to dynamically change queuing policies, even for the documents already enqueued (as the policies are associated with the queues themselves and not the documents, and as they can be updated for each new queued documents, all the documents of an existing queue may be subjected to the new policy; and the ability to let the offering, which is the entity having knowledge of the final semantics of the document, chose the cleanup policy.

Some examples may help to clarify these, and other, advantages of the present methods:

a) Consider an offering collecting trend data. Such an offering, where the goal is to collect statistical data over time, may define a cleanup policy based on random deletions from the queue, as opposed to an "oldest-first" or other policy. A random cleanup policy will likely have less impact on the processing of the data because long term trends may be more accurately preserve than if all data of a certain age were discarded. Hence, because the cleanup policy is dictated by the data consumer (the offering), data important for that consumer is preserved.

b) Next, consider an offering collecting configuration data for asset management. Such an offering may be interested only in the latest configuration of each component. An associated quota policy may be such as to permit deletion of any/all older configuration data for the subject assets that was previously enqueued.

c) Finally, consider an offering collecting alarm data for notification. For such an offering it may be practical to delete data older than a certain date/time or data which will be informative but which did not trigger a notification. Again, because the cleanup policy is set by the data consumer these factors can be accounted for while still making use of a generic communication platform used by other offerings.

Thus methods and systems for effecting cleanup and other policies for queues and similar data stores, which policies account for preferences of consumers of the data so stored have been described. Although discussed with reference to some specific examples, however, the scope of the invention should only be measured in terms of the claims, which follow.

What is claimed is:

1. A method, comprising:
retrieving from a remote registry associated with an offering a queuing policy, described in an XML document, for local storage of one or more documents for transmission from the local storage to one or more end points for said one or more documents through a communication system accessible by the offering;
creating one or more local queues for said one or more documents after retrieving said queuing policy and prior to enqueuing said documents; and
enqueuing said one or more documents at the local storage according to said queuing policy prior to transmission of the documents from the local storage through a network of the communication system to one or more end points and the offering, wherein the queuing policy for the local storage is determined by the offering remotely from the local storage device through the network and stored remotely from the local storage device through the network at the remote registry.

2. The method of claim 1, wherein the registry is co-hosted with at least one the document end points.

3. The method of claim 1, wherein the queuing policy includes queue quota policies for one or more queues of the communication system.

4. The method of claim 1, wherein said one or more documents are queued according to associated qualities of service to be accorded to delivery of said one or more documents.

5. The method of claim 4, wherein the qualities of service are specified in said queuing policy.

6. A method, comprising:
creating one or more local queues for one or more documents after retrieving a queuing policy and prior to enqueuing said documents;
enqueuing, according to the queuing policy described in one or more XML documents and associated with an offering, one or more documents at a local storage for delivery to one or more remote document endpoints, said enqueuing being to one or more created queues, wherein the one or more queues are segregated by quality of service and subject to queue quotas defined by said offering, and wherein said enqueuing occurs prior to delivery of the one or more documents from the local storage through a network of the communication system between the local storage and the offering, and wherein the definition of the queue segregation is determined by the offering and retrieved remotely through the network from a registry supporting the offering.

7. The method of claim 6, wherein said queue quotas define queue cleanups configured to preserve those of said documents useful for said offering to determine trends from data reported by said documents.

8. The method of claim 6, wherein said queue quotas define queue cleanup procedures configured to preserve those of said documents including data indicative of most recent configuration information for assets serviced by said offering.

9. The method of claim 6, wherein said queue quotas define queue cleanup procedures configured to preserve documents including data which triggers notifications by said offering.

10. The method of claim 6, wherein said policies are, prior to said enqueuing, retrieved from a remote registry associated with said offering.

11. A computer-readable storage medium having stored thereon a set computer-readable instructions, which instructions when executed by a computer processor cause the processor to perform a sequence of operations so as to:

retrieve, from a remote registry associated with an offering, a queuing policy, described in an XML document, for local storage of one or more documents for transmission from the local storage to one or more end points for said one or more documents through a communication system accessible by the offering;

create one or more local queues for said one or more documents after retrieving said queuing policy and prior to enqueuing said documents; and enqueue said one or more documents at the local storage according to said queuing policy prior to transmission of the documents from the local storage through a network of the communication system to one or more end points, wherein the queuing policy for the local storage is determined by the offering remotely from the local storage device through the network and stored remotely from the local storage device through the network at the remote registry.

12. The computer-readable storage medium of claim 11, wherein the computer-readable instructions further include additional instructions, which when executed by the computer processor cause the processor to, prior to said enqueuing, effect queue quotas as specified by said queuing policy.

13. The computer-readable storage medium of claim 12, wherein the queue quotas are effected according to queue clean-up policies specified by said queuing policy.

* * * * *

UNITED STATES PATENT AND TRADEMARK OFFICE
CERTIFICATE OF CORRECTION

PATENT NO. : 7,734,605 B2 Page 1 of 1
APPLICATION NO. : 11/209305
DATED : June 8, 2010
INVENTOR(S) : Jean Chouanard et al.

It is certified that error appears in the above-identified patent and that said Letters Patent is hereby corrected as shown below:

Column 10, Line 22, Claim 2:

After "at least one" insert -- of --.

Signed and Sealed this

Thirty-first Day of August, 2010

David J. Kappos
*Director of the United States Patent and Trademark Office*